C. C. Stewart,
Molding Flask.
No. 102,987. Patented May 10, 1870.
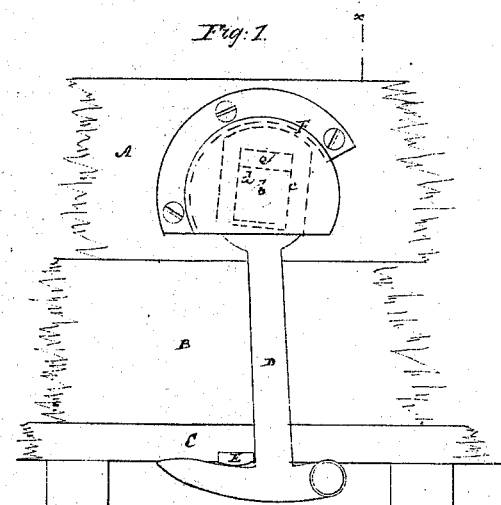
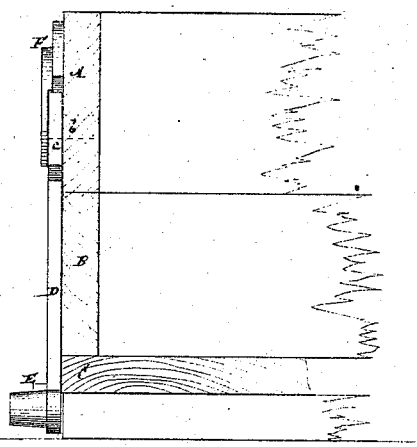
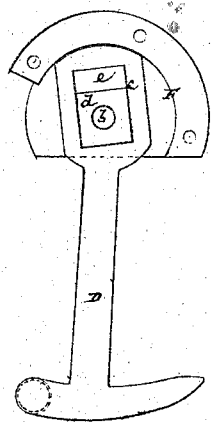
Witnesses:
Fred. Haynes
J. W. Coombs
Charles C. Stewart
per Brown, Coombs & Co.
Attorneys

United States Patent Office.

CHARLES C. STEWART, OF ONEONTA, NEW YORK.

Letters Patent No. 102,987, dated May 10, 1870.

IMPROVEMENT IN FOUNDRY FLASK-CLAMPS.

The Schedule referred to in these Letters Patent and making part of the same.

*To all whom it may concern:*

Be it known that I, CHARLES C. STEWART, of Oneonta, in the county of Otsego and State of New York, have invented a new and useful Improvement in Foundry Flask-Clamps, of which the following is a full, clear, and exact description, reference being had to the accompanying drawing forming part of this specification, and in which—

Figure 1 represents a side view of a flask, in part, with my improvement applied to it;

Figure 2, a transverse section of the same, taken as denoted by the line $x\,x$, in fig. 1; and Figure 3, a side view of the clamp detached.

Similar letters of reference indicate corresponding parts.

My improvement in clamps for foundry flasks consists in a sliding attachment, under control of a rubber or other suitable spring, of the hook or hooks which lock the sections of the flask together, whereby a more secure hold is obtained of said sections, and provision made against shrinkage or wear of the sections; also, whereby the hook may be held in any desired position, out of the way when not in use.

Referring to the accompanying drawing—

A represents the cope, B the body, and C the bottom of a moulder's flask.

D are the hooks in pivoted connection with the cope, and biting when closed under projections E, secured to the bottom, such devices being duplicated or arranged on opposite sides of the flask.

Each hook, D, which is of eccentric form where it locks under the projection E, is hung to swing on a pivot, $b$, arranged to project from a side box, F, secured by screws to the side of the cope or one flask section, and receiving the eye of the hook within it, said pivot $b$ preferably, also, being made to enter the side of the cope, to give increased steadiness.

The eye $c$ of the hook is of a slotted construction, to receive within it a sliding box, $d$, which forms the bearing for the eye of the hook on the pivot $b$. This slot is made sufficiently long in direction of the length of the hook to receive within it a rubber spring, $e$, which serves to lift the hook, so that when the latter is closed under its catch or projection, E, said spring is compressed, and the hook thereby made to establish a firmer or more secure lock, and whereby provision is made against shrinkage or wear of the flask-sections loosening the hold of the clamp; likewise, whereby a sufficient friction is produced to hold the hook in any desired position, and out of the way when not in use.

What is here claimed, and desired to be secured by Letters Patent, is—

The combination of the slotted hook D, the sliding box $d$, and the spring $e$, with the pivot $b$, the whole being arranged for operation relatively with the flask-sections, substantially as specified.

CHARLES C. STEWART.

Witnesses:
A. G. SHAW,
H. HOWE.